Patented Feb. 13, 1951

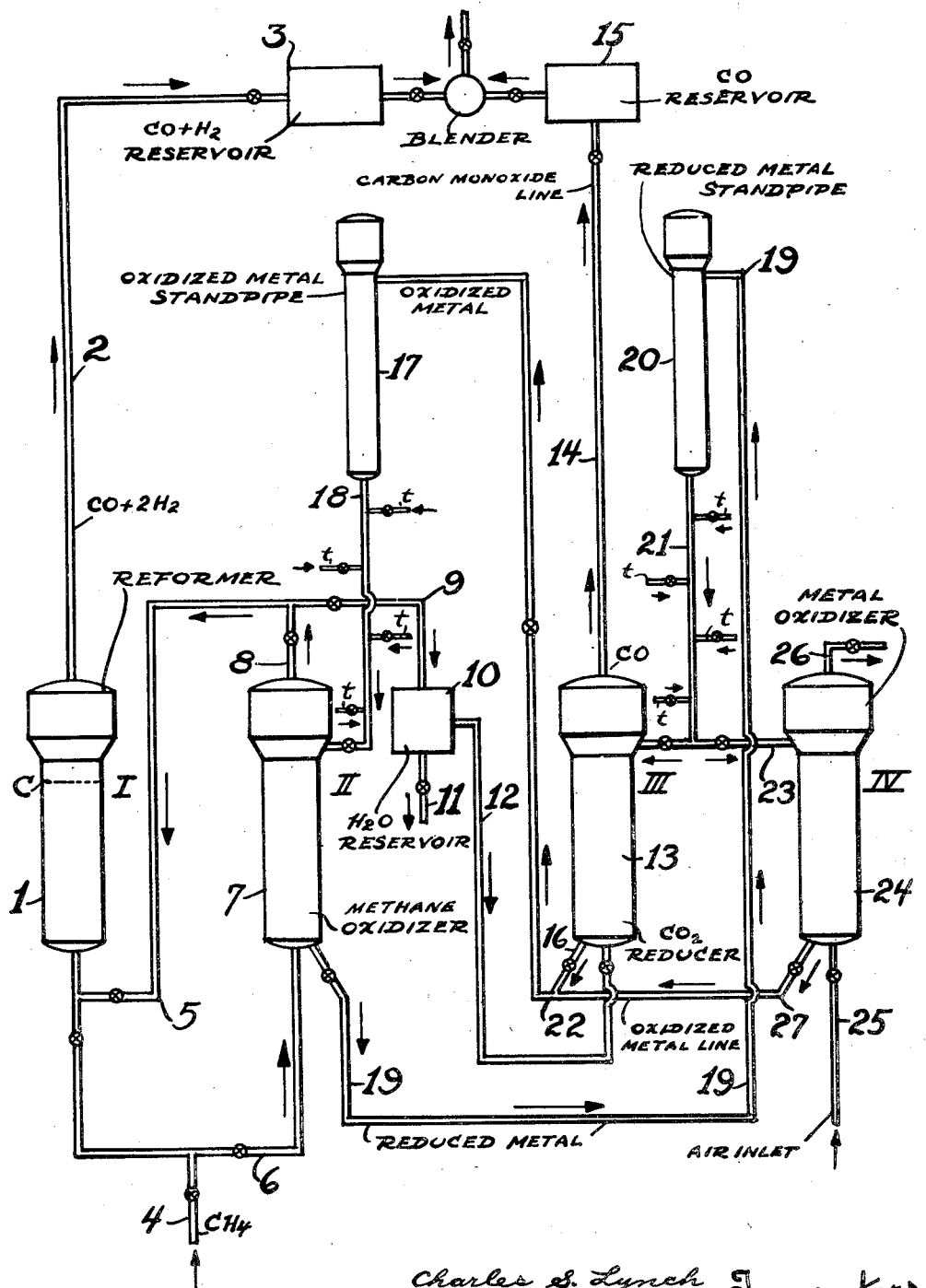

2,541,657

UNITED STATES PATENT OFFICE 2,541,657

METHOD OF MAKING COMMERCIAL MIXTURES OF HYDROGEN AND CARBON MONOXIDE

Charles S. Lynch, Plainfield, Theodore B. Wasserbach, Cranford, and Walter R. F. Guyer, Roselle, N. J., assignors to Standard Oil Development Company, a corporation of Delaware Application March 7, 1947, Serial No. 733,176

4 Claims. (Cl. 48—196)

Our invention relates to improvements in the production of hydrocarbons synthetically from a mixture of carbon monoxide and hydrogen. More particularly, it relates to improvements in the manufacture of the carbon monoxide and hydrogen used as a feed in the hydrocarbon synthesis process.

Synthesis of hydrocarbons and oxygenated hydrocarbons from carbon monoxide and hydrogen is a matter of record and commercial practice in several European countries.

Originally carbon monoxide and hydrogen were required to react at elevated temperatures to form hydrocarbons in the presence of a cobalt catalyst. This cobalt catalyst was supported on a carrier, such as kieselguhr, and ordinarily a promoter, such as thoria was present.

More recently, however, iron compositions have been used as catalysts in the synthesis of hydrocarbons from carbon monoxide and hydrogen. The use of an iron containing catalyst requires a somewhat higher temperature and usually, also, a higher pressure. At the present time in this country a substantial amount of research work is being carried on, directed toward synthesizing hydrocarbons and oxygenated hydrocarbons from carbon monoxide and hydrogen, using an iron-containing catalyst. Many of the research workers in this field are experimenting with the so-called "fluid catalyst technique," that is to say, an operation in which finely divided iron is suspended in the reactants in the reaction zone in the form of a dense, turbulent, ebullient suspension.

Several methods have been proposed for preparing a commercial mixture of carbon monoxide and hydrogen suitable for use in the synthesis of hydrocarbons. For example, it has been proposed to prepare carbon monoxide and hydrogen by reforming methane or natural gas, or even ethane. Reformation of natural gas or the like is an operation in which the gas is treated with steam and carbon dioxide in the presence of a reforming catalyst such as a mixture of magnesium oxide and nickel oxide. If no $CO_2$ is used the product contains 3 mols of hydrogen per mol of carbon monoxide. The use of carbon dioxide is optional, but generally it is used to obtain a product containing 1.5 to 2 mols of hydrogen per mol of carbon monoxide. Other methods for preparing commercial mixtures of carbon monoxide and hydrogen include the coking of heavy oils and thence subjecting the coke to treatment with steam (in a water gas set) at elevated temperatures. A third method of preparing commercial mixtures of carbon monoxide and hydrogen is to gasify coal and other solid combinations of materials by treating said materials with steam or carbon dioxide in a generator at elevated temperatures, say temperatures of from 1700 to 2000° F.

It has been mentioned heretofore that the early work of hydrocarbon synthesis from carbon monoxide and hydrogen employed a cobalt catalyst. In that operation the ratio of hydrogen and carbon monoxide required for satisfactory operation was of the order of two mols of hydrogen per mol of carbon monoxide. The product obtained was paraffinic in character and those hydrocarbons boiling in the gasoline range were very low in octane rating. At the same time, considerable quantities of paraffin wax were formed on the catalyst and, therefore, it was necessary periodically to discontinue the productive phase of the operation in order to wash the catalyst free of the adhering and accumulated wax.

In the iron catalyst process, the ratio of hydrogen to carbon monoxide was somewhat lower, being generally in the order of about one to one and say nine-tenths mols of hydrogen to each mol of carbon monoxide in the feed gas. This operation, conducted at higher temperatures than the process employing cobalt, and also generally employing high pressures in the reaction zone, resulted, however, in a product having a definitely higher octane rating than those constituents of the said product boiling in the gasoline boiling range. Therefore, at the present time the desideratum is to synthesize gasoline employing carbon monoxide and hydrogen as the reactants and an iron catalyst, so as to produce a gasoline fraction of a high octane rating. It is also desired to operate the process so that a minimum quantity of wax and carbonaceous material will be formed on the catalyst.

It is generally known that when natural gas or methane pass over a metal oxide, such as iron oxide or copper oxide, at elevated temperatures, the methane is converted to carbon dioxide and water. But if this formed mixture of carbon dioxide and water is then mixed with sufficient methane, a reaction occurs to form a second mixture, now containing carbon monoxide and hydrogen in which the ratio of hydrogen to carbon monoxide is two to one. This second reaction, commonly referred to as "reforming," is performed in the presence of a reforming catalyst such as a mixture of magnesium oxide and nickel oxide, as stated.

But, as explained above, it is often desired to employ a feed gas for the hydrocarbon synthesis reaction in which the ratio of hydrogen to carbon monoxide is less than two to one. If that is so, additional carbon monoxide must be blended into the mixture and in its most specific aspects our present invention relates to cheap and efficient methods for preparing this additional quantity of carbon monoxide.

It is a main object of our present invention, therefore, to prepare a gaseous mixture containing hydrogen and carbon monoxide by means of a process in which the ratio of hydrogen to carbon monoxide may vary from less than one to one or to two to one.

Another object of our invention is to adjust the ratio of hydrogen to carbon monoxide in a gaseous mixture containing these components so as to increase the carbon monoxide content without a corresponding increase in the hydrogen content by means of a method which is practical and efficient.

Another object of our invention is to adjust to some desired ratio the carbon monoxide content of a gaseous mixture with respect to its hydrogen content, by employing an oxygen donor, in a cyclic process, in which the donor gives up oxygen in one phase of the operation and is re-oxidized in another phase thereof so that an oxidation may be performed without employing oxygen, or an oxygen-containing gas.

Other and further objects of our invention will appear from the following more detailed description and claims.

In the accompanying drawing, we have shown diagrammatically an apparatus in which a preferred modification of our invention may be carried into effect.

Referring in detail to the drawing, we shall first describe the course of the reactants through the system and later explain, in detail, the mode of operation of the several reactors involved. 1 represents a reaction zone in which methane or the like introduced into the system via line 4 and mixed with steam and carbon dioxide from line 5, is then discharged into the bottom of the reformer. The hydrocarbon is reformed by passing the mixture of methane, carbon dioxide and steam into contact with a body of reforming catalyst C at a temperature in the range of from about 1700° F.–2000° F. The products of this reaction, namely, carbon monoxide and hydrogen, are withdrawn from the reformer through line 2 and then passed into a carbon monoxide-hydrogen reservoir 3. A portion of the methane in line 4 is discharged into line 6 and thence into a methane oxidizer 7 where it contacts a heavy metal oxide such as iron oxide, copper oxide, vanadium oxide, chromium oxide, lead oxide, and similar oxides at a temperature of from 1200° F. to 2000° F. This reaction leads to the formation of carbon dioxide and steam. The carbon dioxide and steam are withdrawn from oxidizer 7, via line 8 and a portion thereof discharged into the reformer 1 as previously mentioned. Another portion of the carbon dioxide and steam in line 8 is, however, passed via line 9 into a condenser 10 where it is cooled below the condensation temperature of water. The water is withdrawn from 10 via line 11, and rejected. The carbon dioxide is withdrawn through line 12 and discharged into a carbon dioxide reducer 13. In the latter it contacts a metal such as iron, vanadium, chromium, lead, manganese, etc., in other words, the reduced form of the metallic oxide employed in oxidizer 7. The carbon dioxide reacts with the metal at elevated temperatures to form carbon monoxide and the oxide of the said metal, whereupon the carbon monoxide is withdrawn through line 14 and discharged into a carbon monoxide reservoir 15. The oxidized metal is withdrawn from the oxidizer 13 through line 16 and conveyed into a hopper 17 from which it may be withdrawn, as desired through standpipe 18, and discharged into oxidizer 7.

In oxidizer 7 the metal oxide is reduced by the methane. The thus reduced metal is withdrawn from oxidizer 7 through line 19 and discharged into hopper 20 from which it may be withdrawn as required through line 21 and discharged into the carbon dioxide reducer 13.

Thus, a metal circulates between methane oxidizer 7 and carbon dioxide reducer 13, being oxidized in 13, with the resultant oxide subsequently reduced in 7.

In the event that a greater quantity of metal oxide is required in oxidizer 7 than will be produced by the reduction of the carbon dioxide in 13, a portion of the reduced metal in 20 may be discharged via standpipe 21 and branch pipe 23 into a metal oxidizer 24. Into the bottom of this metal oxidizer, air or other oxygen-containing gas may be discharged via line 25, forced through the metal, and the spent gas may be withdrawn at 26. The oxidized metal is withdrawn from metal oxidizer 24 through line 27 and conveyed to hopper 17.

In operating the foregoing process, it is, as stated, desirable to employ powdered catalysts in zones 1, 7, 13 and 24, and to form in said zones a dense, fluidized, ebullient mass of solids in the gasiform material flowing therethrough. Thus, the powdered solids may have a particle size of from 20 to 200 microns and the gases or vapors flowing therethrough should be caused to flow upwardly in the several zones at a superficial velocity of from ¼ to 3 feet per second so as to form the dense, turbulent, fluidized mass of powdered metal or metal oxide, as the case may be, in the several zones. Furthermore, it is preferable to elevate the hoppers 17 and 20 above the oxidizer 7 and the reducer 13 so that the solids may proceed by natural flow through standpipes 18 and 21, respectively, into the said zones, and, of course, it is desirable to "fluidize" the material flowing in the said standpipes by injection through taps t or the like of slow currents of gas. Also, when it is necessary to convey solids from the lower point to a more elevated point in the system, as where, for example, reduced metal is conveyed from the bottom of oxidizer 7 to hopper 20 and/or oxidized metal is conveyed from the bottom of reducer 13 and metal oxidizer 24 to hopper 17, the same may be accomplished mechanically, or by pseudo-hydrostatic pressure if a fluidizing gas is mixed with the solids in lines 22 or 27, or in suspension if the powdered material is dispersed in a carrying gas.

With respect to the operation performed in the reformer 1, this reaction is highly endothermic in nature. Because of that fact, it will be necessary to supply large quantities of heat to the reformer. This could be done by withdrawing powdered catalyst, heating it by some means, as by burning a fuel in the presence of such withdrawn catalyst, and then returning the catalyst to the reformer 1.

It is within the scope of our invention to employ a stationary bed of catalyst in reformer 7. Since the reformer catalyst may be used for a considerable length of time without requiring regeneration and replacement, and further, since the reaction of reforming methane is so highly endothermic, it may be advisable to employ a conventional reformer furnace which essentially consists of tubes containing catalyst disposed in a cylindrical vessel in which a fuel may be burned in the space surrounding the tubes containing the catalyst.

The skilled engineer, will realize that the drawing is merely a flow plan and that in an actual commercial operation known accessory apparatus not shown in the drawing will be desirable and necessary in order to facilitate the process indicated. For example, since the process involves handling powdered solids in suspension with gases, it will be necessary to employ dust collectors, "cyclone" separators and/or electrical precipitators to remove catalyst or solid fines from gases flowing from the several reaction zones and to provide means for returning those solids to the zone. A good way to accomplish this is to dispose solids-contacting devices in the upper portion of zones 1, 7, 13 and 24 so that effluent gases may be forced therethrough for the purpose of separating entrained solids, which separated solids may then be returned to the dense, fluidized bed existing in the several zones. Also, it will be necessary to provide the apparatus with suitable control valves, pumps, temperature recording devices, etc., but these well-known mechanical aids have been omitted from the drawing in order to focus attention on the novel features of the present invention and to prevent confusion of what is new with what is old.

The final result of our process is to produce separately carbon monoxide and hydrogen, on the one hand, and carbon monoxide, on the other. The synthesis reaction wherein hydrocarbons and oxygenated hydrocarbons are formed by the reduction of carbon monoxide with hydrogen requires different proportions of carbon monoxide with respect to hydrogen in the production of different products. Thus, according to the operation and the desired product, the hydrocarbon synthesis operation may require from ½ to 2 mols or more of hydrogen per mol of carbon monoxide, and our present method provides feasible means by which carbon monoxide and hydrogen may be produced and proportioned to satisfy any given requirement within the limits stated.

Now having generally described the operation by means of a flow plan, we shall proceed to set forth specific examples illustrating our invention by means of chemical equations, operating conditions for each step, and the product analysis.

In reformer 1, the following chemical equation indicates the reaction therein taking place:

$$3CH_4 + CO_2 + 2H_2O \rightarrow 4CO + 8H_2$$

As previously indicated, the catalyst here may be a mixture of magnesium oxide and nickel oxide, the proportions of which may be 75 parts by weight MgO, and 25 parts by weight NiO, the former being a carrier.

In a particular methane reformation run carried out in the presence of the foregoing catalyst at a temperature of around 1700° F. and a feed rate of 100 volumes of gas per volume of catalyst per hour, the feed gas containing about 3 mols of methane per mol of carbon dioxide, per 2 mols of steam, the following product was obtained:

| Product Analysis | Volume Per Cent |
|---|---|
| $CO_2$ | 1 |
| $H_2O$ | 2 |
| $H_2$ | 60 |
| $CO$ | 30 |
| $CH_4$ | 7 |

In methane oxidation zone 7, the following equation indicates the course of the reaction:

$CH_4$ + metal oxide →
    metal or lower oxide + $CO_2$ + $2H_2O$

Two runs were made in the oxidation of methane using ferric oxide in one run and copper oxide in the other. The results of these runs are set forth below. The feed rate in both runs was 100 volumes of gas per volume of catalyst per hour.

| Metal Oxide | $Fe_3O_4$ | CuO |
|---|---|---|
| Temperature, ° F | 1700–1800 | 1600–1700 |
| Product Analysis, Mol Per Cent: | | |
| $CO_2$ | 30.9 | 31.5 |
| $H_2O$ | 61.6 | 63.0 |
| $H_2$ | 0.8 | 0.4 |
| $CO$ | 0.4 | 0.5 |
| $CH_4$ | 6.3 | 4.6 |

The temperature of the foregoing step may vary from 1200° F. to 2000° F., with best results being attained about midway or a little higher than midway in the foregoing temperature range.

In carbon dioxide reducer 13, the reaction therein taking place may be indicated by the following equation:

Metal or lower metal oxide + $CO_2$ →
    CO + metal oxide or higher metal oxide At a feed rate of 100 volumes of carbon dioxide per volume of metal per hour, the following products were obtained:

| | |
|---|---|
| Metal | Fe |
| Temperature, ° F | 1500 |
| Products: | |
| Metal oxide | $Fe_3O_4$ |
| Gas | CO, 66% by vol. $CO_2$, 33% [1] |

[1] A small amount of carbon was formed.

At 1000° F., the product contains about equal mols of carbon monoxide and carbon dioxide and hence higher temperatures than this are preferred, to give a preponderance of carbon monoxide. It is not advisable, however, to operate at temperatures above about 1700–1750° F. for the presence of substantial amounts of carbon dioxide in the synthesis gas (say up to 25 to 35%) is not objectionable.

In zone 24, the reaction therein taking place may be illustrated by the following equation:

Metal or lower metal oxide + air →
    metal oxide + $N_2\uparrow$

In this step, temperatures of from 1000° F. to 2000° F. are generally employed.

To recapitulate briefly, our invention relates to a method for preparing a feed gas to be used in the synthesis of hydrocarbons and oxygenated hydrocarbons. In its essence, our invention involves reforming methane to form carbon monoxide and hydrogen, in a separate zone, oxidizing methane to form carbon dioxide and steam, removing the steam from a portion of the carbon dioxide and steam mixture and reducing the carbon dioxide to carbon monoxide, which carbon monoxide is recovered separately from the previously mentioned carbon monoxide and hydrogen, thus providing quantities of carbon monoxide and hydrogen, on the one hand, and carbon monoxide on the other, which may be blended to give a desired ratio of hydrogen to carbon monoxide. The reduction of the carbon monoxide is performed in a cyclic process wherein a heavy metal oxide is oxidized while the carbon dioxide is reduced, and furthermore in which the thus formed metal oxide is used to oxidize methane to form carbon dioxide and water or steam. A portion of the carbon dioxide and steam formed in the methane or natural gas oxidizing zone is fed with the methane or natural gas, to the reforming step. By the foregoing procedure, therefore, one may prepare a synthesis gas containing from ½ or less to 2 mols of hydrogen per mol of carbon monoxide.

Numerous modifications of our invention may be made by those familiar with this art without departing from the spirit thereof.

What we claim is:

1. The method of producing a normally gaseous fuel containing carbon monoxide and hydrogen, which comprises subjecting a normally gaseous hydocarbon to reforming in the presence of added carbon dioxide and steam in a reforming zone maintained at elevated temperatures and containing a body of reforming catalyst, recovering and collecting from said reforming zone a product containing carbon monoxide and hydrogen, conducting another portion of said normally gaseous hydrocarbon to a first oxidation zone where it is contacted with a heavy metal oxide at elevated temperatures to form a product containing carbon dioxide and steam, withdrawing carbon dioxide and steam from said oxidizing zone and conducting it in part to said reforming zone, conducting another portion of said product containing carbon dioxide and steam to a condensation step where it is cooled sufficiently to liquefy the steam, recovering carbon dioxide from said condensation step and conducting it to a carbon dioxide reducing zone where it is contacted with a heavy metal at elevated temperatures, the said metal being in the form of a fluidized bed, to form a product containing substantial quantities of carbon monoxide, recovering and collecting said last-named product, withdrawing reduced metal from said first oxidizing zone, conducting it in part to said carbon dioxide reducing zone where it is formed into said fluidized bed, conducting another portion of said metal to a zone where it is oxidized with a free oxygen containing gas and therein undergoes oxidation, and returning the thus oxidized heavy metal to said first oxidizing zone and blending the product from the reforming zone with the carbon monoxide from the carbon dioxide reducing zone to form a mixture having the desired ratio of hydrogen to carbon monoxide.

2. The method set forth in claim 1 in which the normally gaseous hydrocarbon is predominantly methane.

3. The method set forth in claim 1 in which the metal alternately reduced in the first oxidizing zone and oxidized in the carbon dioxide reducing zone is iron.

4. The method set forth in claim 1 in which the metal oxide in powdered form is fed by gravity through an aerated standpipe into said first oxidizing zone, and in like manner the reduced metal powder is fed by gravity through an aerated standpipe into said carbon dioxide reducing zone.

CHARLES S. LYNCH.
THEODORE B. WASSERBACH.
WALTER R. F. GUYER.

REFERENCES CITED

The following references are of record in the file of this patent:

UNITED STATES PATENTS

| Number | Name | Date |
|---|---|---|
| 1,899,184 | De Simo | Feb. 28, 1933 |
| 1,957,743 | Wietzel | May 8, 1934 |
| 1,984,380 | Odel | Dec. 18, 1934 |
| 2,270,897 | Roberts et al. | Jan. 27, 1942 |
| 2,383,715 | De John | Aug. 28, 1945 |